(12) United States Patent
Wagner

(10) Patent No.: US 8,105,639 B2
(45) Date of Patent: Jan. 31, 2012

(54) PROCESS OF PRECOOKING GRAINS AND AN EQUIPMENT FOR PRECOOKING GRAINS

(76) Inventor: Werner Erwin Wagner, Ijui (BR)

( * ) Notice: Subject to any disclaimer, the term of this patent is extended or adjusted under 35 U.S.C. 154(b) by 44 days.

(21) Appl. No.: 12/498,156

(22) Filed: Jul. 6, 2009

(65) Prior Publication Data

US 2010/0003385 A1   Jan. 7, 2010

Related U.S. Application Data

(62) Division of application No. 10/477,844, filed as application No. PCT/BR02/00054 on Apr. 16, 2002, now abandoned.

(30) Foreign Application Priority Data

Oct. 30, 2001 (BR) ..................................... 0104889

(51) Int. Cl.
*A23L 1/20* (2006.01)

(52) U.S. Cl. ........ 426/455; 426/459; 426/506; 426/507; 426/508; 426/509

(58) Field of Classification Search ........................ None
See application file for complete search history.

(56) References Cited

U.S. PATENT DOCUMENTS

| | | | | |
|---|---|---|---|---|
| 3,647,484 A | * | 3/1972 | Yokotsuka et al. | 426/18 |
| 4,059,919 A | * | 11/1977 | Green | 47/1.1 |
| 5,284,085 A | * | 2/1994 | Palm | 99/348 |

* cited by examiner

*Primary Examiner* — Lien Tran
(74) *Attorney, Agent, or Firm* — Fish & Richardson P.C.

(57) ABSTRACT

A process of precooking grains which comprises the steps of: a) Charging the grains into a reactor in a controlled manner; b) Applying a first negative pressure to the reactor; c) Heating the grains contained in the reactor; d) Applying a second negative pressure to the reactor; and e) Cooling the grains. Equipment for precooking grains comprises at least one reactor, which is associable with means for applying negative pressure.

14 Claims, 4 Drawing Sheets

PROCESS OF PRECOOKING GRAINS AND AN EQUIPMENT FOR PRECOOKING GRAINS

CROSS REFERENCE TO PRIOR APPLICATION

This application is a divisional of U.S. application Ser. No. 10/477,844, filed Oct. 25, 2004 now abandon, which is the National Phase of PCT/BR02/00054 filed Apr. 16, 2002. The disclosure of prior applications are considered part of and are incorporated by reference in the disclosure of this application.

The present invention relates to a process of precooking grains, particularly used in precooking soybeans for the purpose of enhancing the digestibility of this foodstuff, beside reducing/eliminating the existence of micotoxins or toxins formed by fungi, and also to an equipment for precooking grains, particularly used in conjunction with this process.

This application corresponds to the Brazilian priority application PI 0104889-9 which is hereby incorporated by reference.

DESCRIPTION OF THE PRIOR ART

There are innumerable processes for heating soybeans and other grains with a view to eliminate antinutritional enzymes and to improve their digestibility. In these processes soybeans are processed by indirect and/or direct heating with vapor, by electrical resistances, flames produced by gas, combustible oil, firewood and others, in open or closed containers, either fixed or rotary, with stirrers of various types, such as blades, pallets and helicoids.

The difference between one and another system or process with respect to the final quality depends exclusively upon an adequate handling of both the process and the product.

As known equipment and processes we can cite:

a) Dry extruders for deactivating the soybeans. This equipment has an axle and an endless screw, grinds and compresses the product causing it to heat, thereby deactivating the undesirable enzymes of the soybeans. The disadvantages refer to the high consumption of power, high loss of humidity, high oxidation of the fats and co-oxidation of the proteins. In addition, there is a much wear of the equipment, and the end product is extracted with high temperature and further containing micotoxins (fungus toxins) and pesticides.

b) Vapor extruders, an equipment that also comprises an axle with thread and an endless screw and can receive either whole or ground grains. The process consists in compressing the product and heating it with vapor, thus deactivating the enzymes of the soybeans and improving the digestibility. In comparison with the dry extruder, the consumption of power of the vapor is lower. However, considering the steps of pre-grinding, cooling and drying, the consumption of power becomes very high. The oxidation of the fats and proteins is lesser than in the previous process; but, due to the high humidity of the product in the process, harmful microorganism such as *salmonella* often forms. In addition, this process does not eliminate the micotoxins and pesticides.

c) The multistage vertical roaster is an equipment that has several vertical cylindrical chambers with a central axle driven by a motor and a velocity reducer, stirring pallets and passageways from one stage to another with adjustment level. The stages have vapor sleeves on the bottom and on the walls, and also a live-vapor injecting system. This equipment can work with either whole or ground grains.

The disadvantages with respect to the ground grains are in the fact that the latter, after the processing, present a high rate of oxidation of the fats with a high value of fatty alcohol, peroxides and co-oxidation of proteins. Right after the end product is withdrawn from the process, formation of anisidin begins, raising the index of totox.

If one works with whole grains, the oxidation rate is 3 to 5 times lesser, but the smaller and broken grains are excessively heated and the bigger grains go through more quickly and are insufficiently treated, which causes the enzymes not to be satisfactorily eliminated.

Moreover, due to the fact that the product comes out hot and humid, liquid flows out and crusts form on the conveyors and on the cooler, which are focus of high contamination by microorganism such as *salmonella*. This process does not reduce the micotoxin and pesticides.

d) Tubular horizontal vapor toasters are composed by horizontal cylindrical bodies with a vapor sleeve, a central axle with pallets or helical plates that carry the product from one end to the other and may or may not receive live vapor in counterflow. This vapor heats the product and deactivates the undesirable enzymes of the soybeans. However, when no live vapor is injected, the product undergoes a strong roasting effect and loses nutrients due to the burning thereof. Other disadvantage lies in the high level of oxidation of fats and in the co-oxidation of proteins, in addition to dehydration of 4 to 6% of the product. On the other hand, when live vapor is injected during this process, a strong hydration occurs, which increases the humidity of the product by 3-4%. In this way, the toasting effect is reduced and the loss due to burning and oxidation decreases by up to 70%, however, due to the high humidity, the product requires a drying step. In addition, the humid product forms crusts on the carrying, drying and cooling equipment, forming focus of microorganisms of the salmonella type.

e) The horizontal toasters with direct fire function in a similar way as the tubular horizontal vapor toasters, but they utilize a direct flame in a normally rotary horizontal cylinder, where the grains circulate in a direction opposite to the flame. The disadvantages of this type of equipment and the corresponding process refer to strong heat shock which the product undergoes, created by combustion gases, which causes partial burnings and high oxidation of the nutrients. The treated product does not become uniform, because the smaller particles are excessively toasted and the bigger ones are not sufficiently toasted. The smaller particles are retained longer in the process, whereas the bigger grains pass more quickly. Also several types of fuels are used, as for example, gas, combustible oil or firewood, among others. Each of these fuels aggregates residues to the product and, if the quality of combustion varies, the quality of the end product will also vary.

Like previous equipment cited previously, the product additionally goes to the cooler at a high temperature and, consequently, the problem of contamination by microorganism arises.

f) Autoclave digesters are horizontal cylindrical bodies with an internal stirrer, heated by indirect vapor through the sleeve and by direct vapor through injection via axle. The main operational disadvantage of this equipment lies in the fact that the product has to be treated in batches, unlike the other processes, which are continuous. This reduces the productive capacity, since the products to be treated have to be pre-measured or cubed, and several valves have to be opened and closed frequently, the times should be controlled and care should be taken to prevent residues of the product from remaining inside the equipment at the time of replacing a batch with another. This equipment basically work under pressure and discharges the product hot and humid, and so subsequent drying and cooling are required, which entails the same problem of most other equipment, namely contamination by microorganisms. The problem of oxidation of the fats and co-oxidation of the proteins is average when compared with the other processes.

The U.S. Pat. No. 4,413,018 relates to a method of preparing whole oat grains for the purpose of deactivating the enzymes and extending the period of preservation of the product. In this process one heats the product by means of boiling water and vapor up to a temperature capable of deactivating the enzymes, so as not to cause oxidation of the grains. In this cooking process, the water is in direct contact with the product, which represents a serious problem due to excess humidity, loss of nutrients in the water and problems of polluted effluents.

On the other hand, document EP 0222965 describes a method of precooking rice and other cereals. This precooking process comprises steps of adding pressurized vapor and pressurizing the product in autoclaves. However, rice needs to be soaked, and both the equipment and the process used are not adaptable to soybeans, maize and others.

Document PI 9005734-1 relates to a process and an equipment for deactivating soybeans in natura, with a view to eliminate the enzymes present in the soybeans, which inhibit the production of calcium when assimilated by living organisms.

The equipment described in this document utilizes stirring blades, which inject vapor into the product. However, it is known that injecting vapor by means of these blades is problematic, because, when the perforations in the blades are clogged with product, it is almost impossible to clean them, and this cause irregular heating of the product to the detriment of its quality. Moreover, since the blades are rotary and the container that holds the product usually is not filled completely, a portion of this vapor is injected onto the surface of the product, which overheats the latter, impairs its quality, and results in excessive consumption of vapor.

With regard to the process described in PI 9005734-1, it presents a high level of fat oxidation and protein co-oxidation, beside not providing reduction of micotoxins and pesticides present in the soybeans.

None of the mentioned processes eliminates or reduces considerably micotoxins and/or pesticides, and none of them works with vacuum, exposing the product to oxidation with air oxygen.

OBJECTIVES OF THE INVENTION

The objective of the present invention is to provide a process of precooking grains, capable of enhancing the digestibility of the processed grains and simultaneously eliminating the micotoxins and pesticides contained in the grains, without adding other chemicals to the product.

Another objective of this invention is to provide an equipment for precooking grains, which enables one to use low pressures and can be used with the process of precooking grains, preventing oxidation of fats and reducing significantly the existing oxidation.

BRIEF DESCRIPTION OF THE INVENTION

The objectives of the present invention are achieved by means of a process of precooking grains that comprises the steps of:
a) Charging the grains into a reactor in a controlled manner;
b) Applying a first negative pressure to the reactor;
c) Heating the grains contained in the reactor;
d) Applying a second negative pressure to the reactor; and
e) Cooling the grains.

The present invention has also the objective of providing an equipment for precooking grains, which comprises at least one reactor that is associable with means for applying negative pressure.

BRIEF DESCRIPTION OF THE DRAWINGS

The present invention will now be described in greater detail with reference to an embodiment represented in the drawings. The figures show.

DETAILED DESCRIPTION OF THE FIGURES

Figure 1:
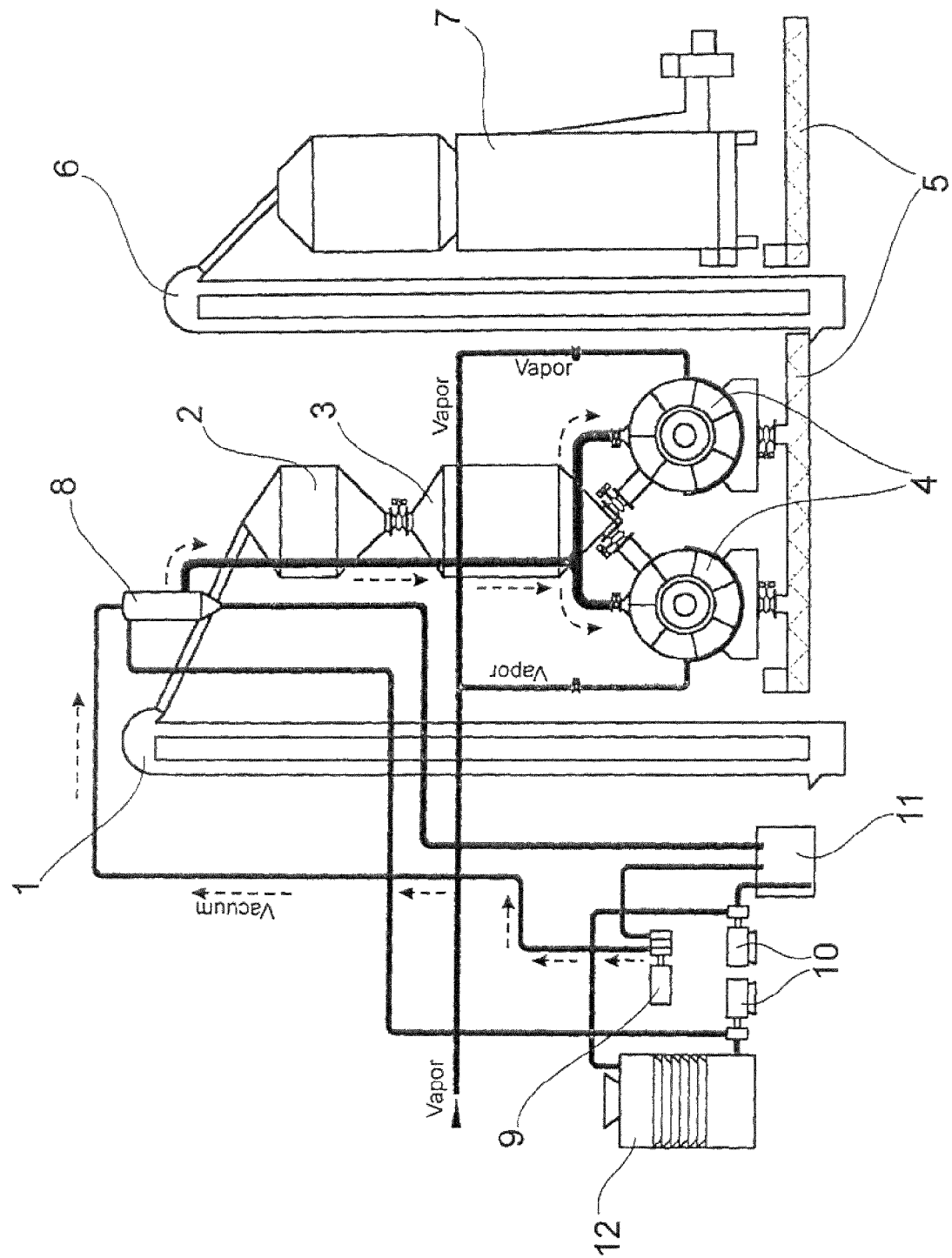
FIG. 1—is a schematic view of a first embodiment of the equipment for precooking grains of the basic process of the present invention.

According to a preferred embodiment and as can be seen in FIG. 1, the equipment for precooking grains comprises a first vertical conveying element 1, a feeder 2, a dosing means 3, one or two reactors 4, a horizontal conveyor 5, a second vertical conveyor 6, a cooler 7, a barometric condenser 8, a means for applying negative pressure 9, centrifugal pumps 10, a barometric tank 11, and a cooling tower 12.

The first vertical conveyor 1 may be a vertical bucket elevator or the like. The latter is responsible for supplying grains to the feeder 2, which is associated with the dosing means 3. The flow of grains between the feeder 2 and the dosing means 3 is controlled by means of automatic valves.

The reactor 4 is associated with the dosing means 3 and receives therefrom a calculated and monitored amount of grains. This grain-flow control is also effected by means of automatic valves.

Figure 4:
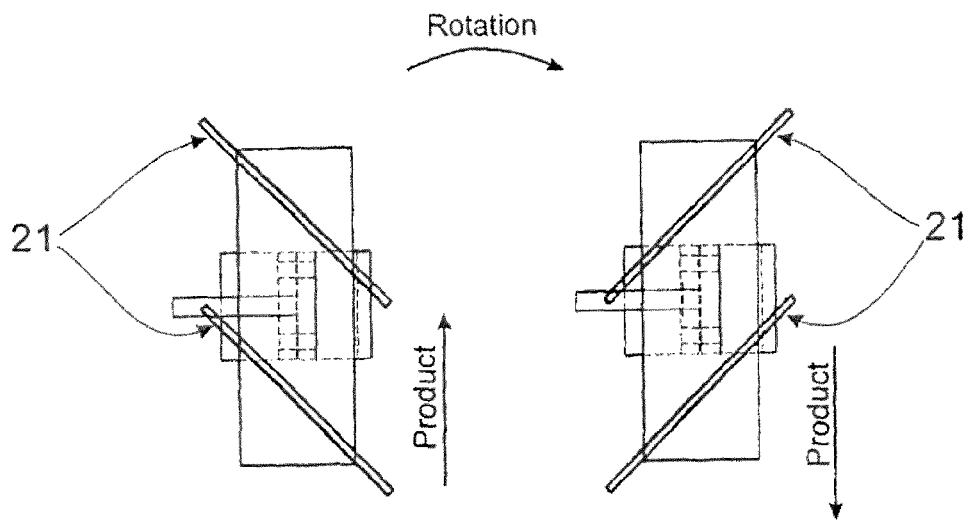
FIG. 4—is a top view of the homogenizing flaps existing inside the reactor that composes the equipment of the present invention.
Figure 5:
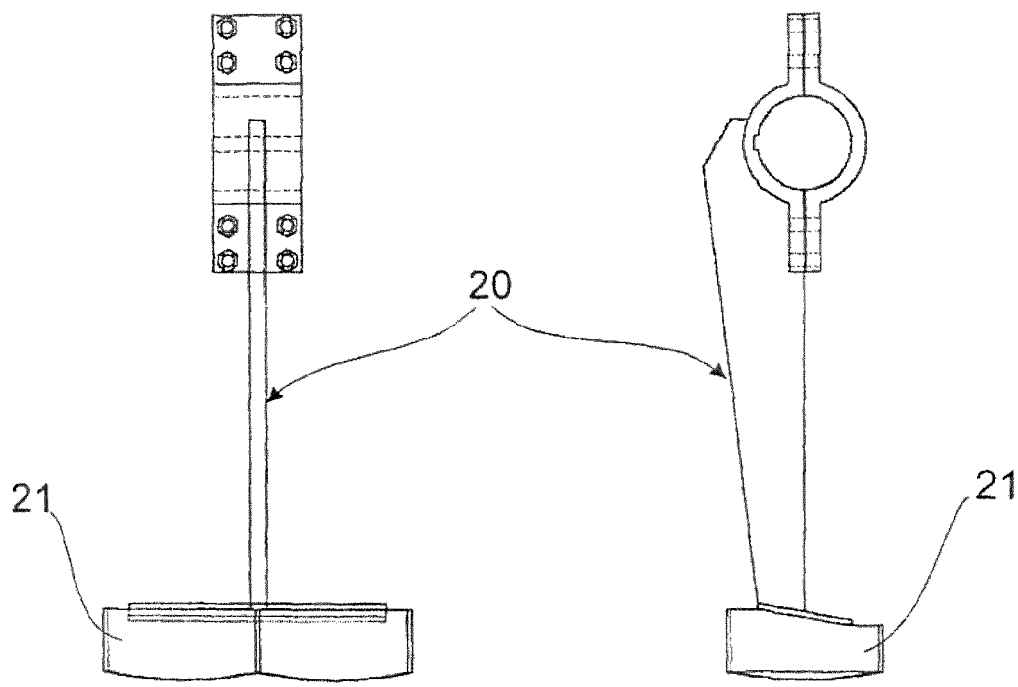
FIG. 5—is a front view of the arm containing the homogenizing flaps existing inside the reactor that composes the equipment of the present invention.
Figure 6:
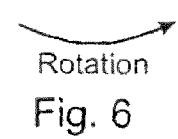
FIG. 6—is a right side view of the arm containing the homogenizing flaps existing inside the reactor that composes the equipment of the present invention.

In the inner portion of the reactor 4 there are several arms 20 comprising inclined flaps 21, as illustrated in FIGS. 4, 5 and 6. The function of this assembly is to homogenize the product while the latter is inside the reactor 4 and also to facilitate the complete discharge of the product after it has been cooked. The flaps 21 may be right or left and work in rotation movement.

The grains contained in the reactor 4 are indirectly heated by means of the dry saturated vapor that passes through a sleeve and that transfers heat to the grains. This way of heating provides a variable of moistening the grains by 1% more and/or less.

The grains are also heated in a direct way, also by means of dry saturated vapor. This vapor is distributed by an injection system that injects live vapor in a tangential way, by dipping the product. In this way, this vapor first comes in contact with the base of the product before reaching the surface of the volume.

This direct vapor-injection system is independent from the inclined flaps 21 existing inside the reactor 4.

The reactor 4 further receives an application of negative pressure or vacuum, so that the internal environment will be free from air. For this purpose, the equipment is provided with means for applying negative pressure 9 associated with a barometric condenser 8 and with a barometric tank 11.

Figure 3:
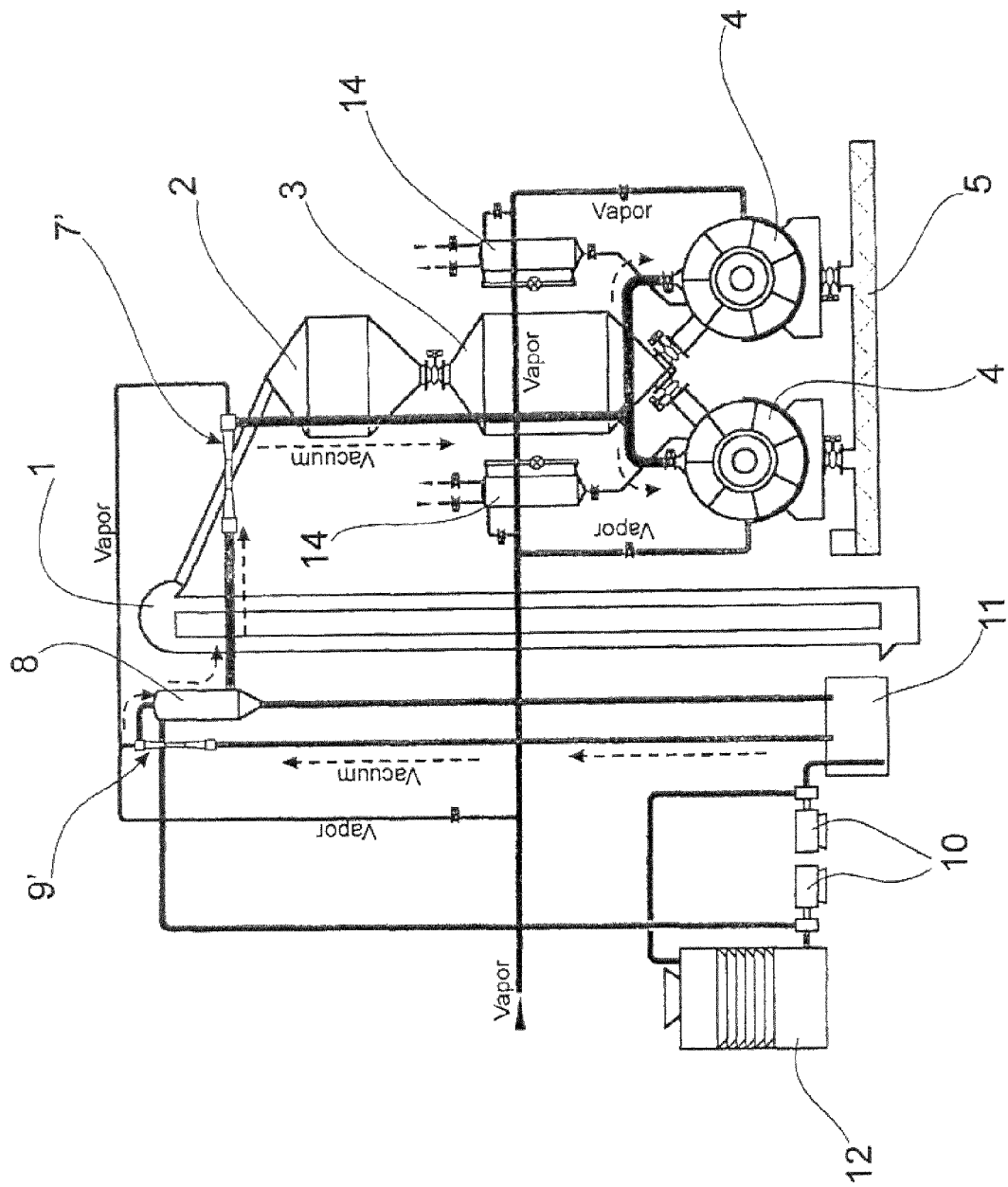
FIG. 3—is a schematic view of a third embodiment of the equipment for precooking grains, which have the basic characteristics of the two preceding items, complemented with drying and deep cooling, which may reach 15° C. at the end or less without any air-cooling.

In a first preferred embodiment, one uses a vacuum pump 9 associated with a barometric condenser 8 and with the reactor 4. As can be seen in FIG. 3, in a third embodiment the vacuum pump 9 is replaced by two ejectors, the first ejector being of the "Z" 9' type, arranged between the barometric tank 11 and the barometric condenser 8, and the second ejector being of the "Y" 7' type, also called vapor booster (thermocompressor), arranged between the barometric condenser 8 and the reactor 4. The ejector 9' may replace the vacuum pump in the function of applying negative pressure to the interior of the reactor 4 when it is necessary to apply a negative pressure, or vacuum, of up to absolute 45 mmHg. This ejector produces vacuum above the boiling point of the water in the barometric condenser 8.

Figure 2:
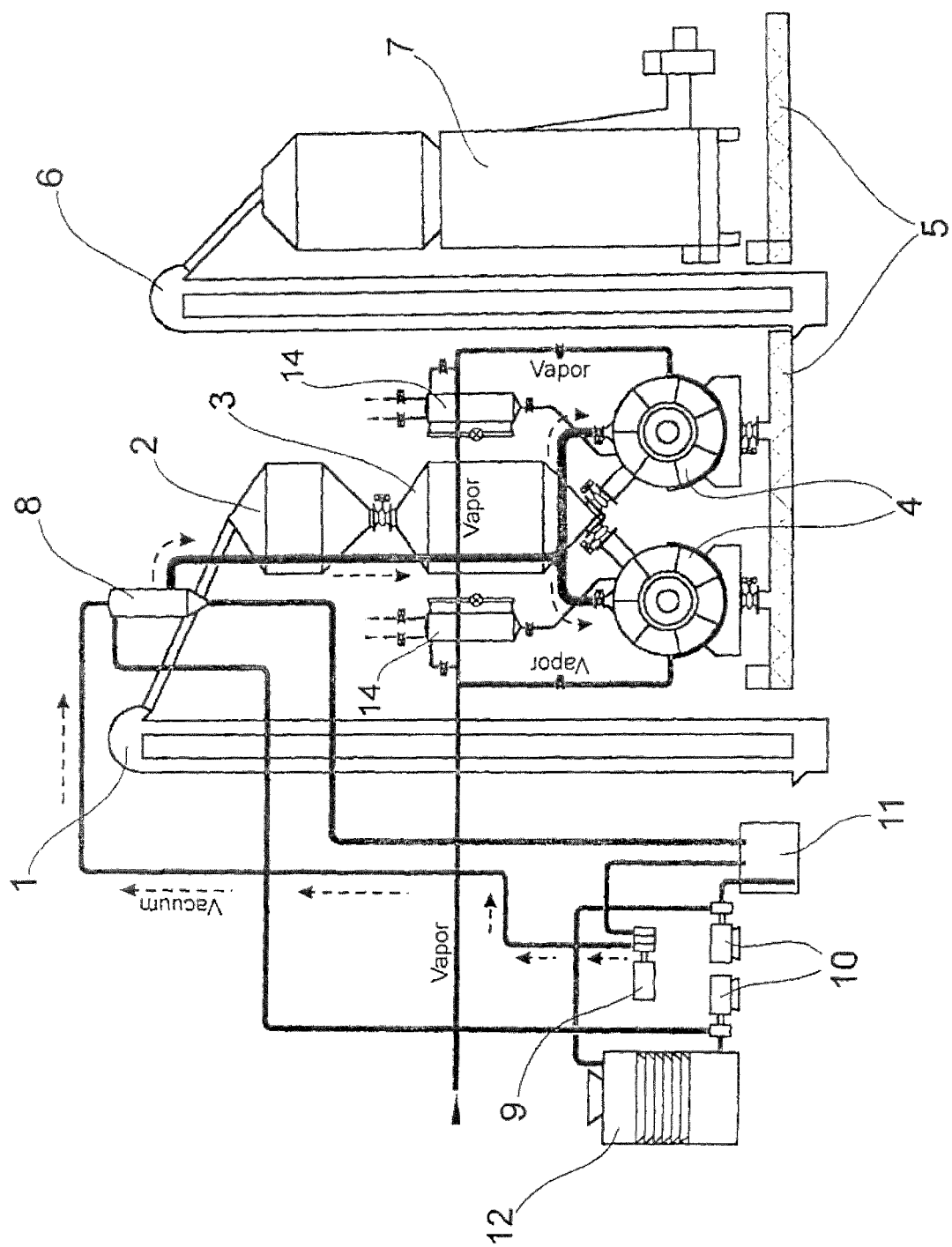
FIG. 2—is a schematic view of a second embodiment of the equipment for precooking extremely dry grains that need much humidity.

Moreover, when one intends to work with vacuum up to absolute 6 mmHg, the equipment is complemented with the booster 7', when the final temperature of the product reaches 15° C. or less, without any need for the cooler 7 of FIGS. 1 and 2. The booster 7' produces vacuum below the boiling point of the water of the barometric condenser 8.

The booster 7' receives, at one end, vapor under high pressure. By venturi system, gases and vapors are aspirated on the vapor inlet side and compressed on the opposite side, which enlarges the vacuum in the system in which it is incorporated. With this system, one can lower the absolute pressure (vacuum) until the liquid phase of the water disappears, and only the solid phase of the water (ice) and vapor remain. Although the booster 7' increases the consumption of vapor and cooling water, it should be used whenever the precooked product is intended for human consumption, considering the possibility and need for it reaching pressures in the range of up to 6 mmHg.

The cooling tower 12 is associated with the barometric condenser 8 for the purpose of supplying cooling water for the heat exchange that takes place inside the condenser. This water is circulated due to the pressure supplied by the centrifugal pumps 10.

The barometric condenser 8 condenses the water vapors that are aspirated from the reactor 4 in the form of vapor and discharges them in the form of water to the barometric tank 11.

The water from the cooling tower 12 is at a temperature of about 30° C. This water condenses the vapor that comes from the reactor 4, in the barometric condenser 8, increasing its temperature to 35° C. Each 1 kilo of vapor aspirated has 650 Kcal. Thus, 130 liters of water are required for condensing 1 kilo of vapor, heating this water from 30° C. to 35° C. The water falls out of the condenser 8 into the barometric tank 11 and is them pumped to the cooling tower 12, in which the function is inverted and again 1 liter of water is evaporated, causing the water to cool from 35° C. down to 30° C. This water is again pumped into the condenser. The water-to-vapor and vice-versa phase change absorbs 550 Kcal, which is equivalent to heat 550 liters of water at 1° C.

The horizontal conveyor 5 carries the product extracted from the reactor 4 as far as the second vertical conveyor 6.

Once the grains are in the second conveyor 6, they are placed in the cooler 7, as illustrated in FIGS. 1 and 2.

According to a second and a third embodiments illustrated in FIGS. 2 and 3, the equipment for precooking grains may be equipped with automatic moisteners 14. These moisteners are used when the humidity of the processed grains is lower than 11%; then the moisteners will correct the humidity to the ideal range, which is from 12 to 12.5% humidity.

The process of precooking grains comprises the steps of:
a) Charging the grains into a reactor 4 in a controlled manner;
b) Applying a first negative pressure to the reactor 4;
c) Heating the grains contained in the reactor 4;
d) Applying a second negative pressure to the reactor 4; and
e) Cooling the grains.

The first vertical conveyor 1 carries the still not cooked grains as far as the feeder 2. From the feeder 2 the grains are charged into the dosing means 3, and then they are carried in a controlled and monitored way into the container 4, which is a reactor.

The reactor 4 containing the grains to be cooked is hermetically closed. Then, a first negative pressure, vacuum, is applied to the inside of the reactor 4, which causes its internal pressure to be around an absolute pressure of 6 mmHg until a relative pressure about 4 Kg/cm2. This negative pressure is applied by means of a vacuum pump 9 and also by means of ejectors of types "Z" and "Y" 9' and 7', respectively.

With application of vacuum, all the air existing inside the reactor 4 is withdrawn. This step is of fundamental importance, since the presence of air prevents a homogeneous heating of the grains, because air is a poor heat conductor and forms pockets that provide irregular heating of the product. Moreover, air has 20% of oxygen, which is capable of oxidizing fats, forming peroxides, hydroperoxides, fatty alcohol, free fatty acids, and co-oxidation of the proteins may also occur, forming free radicals. The oxidation of fats is a curve wherein the higher the temperature the higher and faster the oxidation, if the oxygen is available.

In this way, after application of the first vacuum, the product is no longer in contact with oxygen, which provides a reduction of the oxidation of peroxides by 40 to 80% and also prevents further co-oxidation of the proteins and anizidin.

After the step of applying the first negative pressure, there is a minor drop in temperature of the product, which is compensated at the step of heating the grains contained in the reactor 4. This heating is effected in two ways: (i) by means of direct and tangential injection of vapor onto the grains and (ii) by indirect heating, the vapor passing through a sleeve that transfers heat to the grains.

Upon completion of the heating, the grains may reach a temperature of about 100° C. to 125° C.

After the heating, the grains are cooked. This step consists ion maintaining the grains at the cooking temperature, about 100° C.-125° C., for a determined period of time which may vary from 1 to 25 minutes. Depending upon time, temperature and pressure, the cooking may be more or less intensive.

Upon completion of the cooking, the internal pressure of the reactor 4, which is positive, ranges from 0.5 to 1.5 Kg/cm2. This pressure will again be reduced due to application of the second negative pressure, vacuum, when this pressure will be negative and around 0.9 Kg/cm2, that is to say, there is a differential of from 1.4 to 2.5 Kg/cm2. The great effect of the cooking and the consequent increase in digestibility of the product will take place upon variation of the pressure, mainly in this application of the second negative pressure, when the positive pressure of 0.5-1.5 Kg/cm2 is changed into the negative pressure of 0.9 Kg/cm2, or else absolute pressure of 6 mmHg. In these conditions, one liter of water, which is equivalent to 1 Kg of vapor, changes into 1.2 m3 of vapor (an increase of 1:1.200), exploding within the grain, breaking the cell membranes and exposing the nutrients, so that the can be absorbed in the digestion of the animals or human beings more easily.

Further in this step, the temperature of the product drops from about 100° C.-125° C. to about 60° C.-15° C., depending upon the vacuum intensity, and the humidity of the product, which was between 20 and 21%, drops to the range of from 12 to 12.5%.

This drop in humidity in this process is very intensive, if compared with the drop that occurs in known processes that use direct vapor. As a result, these processes of the prior art need a complementary step of intensive and impairing drying.

On the other hand, in the known processes that use only indirect vapor or flame or hot air of an extrusion system, the humidity of the end product is lower than that of the product in the beginning of the process. However, the end temperature is higher than 100° C., and so there is a need to cool the product intensively, which results in physical losses and high oxidation.

Thus, during this step of applying the second negative pressure, a lyophilization process takes place, which consists in evaporating water from the grains in vacuum, that is to say, in consuming heat from the grains, and lowering their temperature and humidity. In this way, each liter of water evaporated in vacuum consumes 550 Kcal, cooling the product. Thus, taking soybeans as an example, one knows that it has a specific heat of 0.6 Kcal/Kg, which means that 0.6 Kcal will be required to cool 1 Kg of soybeans at 1° C., or else one liter of water evaporated in vacuum to cool 9.6 Kg of soybeans from 110° C. down to 15° C., or to cool 23 Kg of soybeans from 110° C. down to 70° C., beside reducing the temperature of the water in the product too.

In short, the volume of vapor injected into the product during the heating condenses, moistens, heats and raises the pressure inside the reactor 4. During this lyophilization process, the situation is inverted, that is to say, the pressure (vacuum) drops, the condensed vapor evaporates again and the heat and water added in the heating are removed and go to the barometric condenser. This is the inversion of values.

As a result of this step, the micotoxins B1, B2, G1, among others, and various pesticides are dragged.

The micotoxins and pesticides are dragged by the re-evaporation of water (vapor) during the step of applying the second negative pressure (vacuum). Most pesticides have an evaporation, volatilization point that is raised in vacuum and aided by re-evaporation of water. The micotoxins are residues of fungi deposited into microchannels which the fungi usually make between the husk and the pulp of the grain and around the germ. When the water condensed in the grain expands over the vacuum of 1:1.200 or more, and emigrates from the barometric condenser at a speed of from 40 to 50 m/s (144-180 Kg/h), it preferably utilizes the ducts (channels) left by the fungi, thus dragging the micotoxins deposited in these channels. It should be pointed out that the crushed or ground grains that have the ducts left by the fungi destroyed will no longer permit elimination of toxins.

In this step, 1 liter of water expands in the product within the reactor into 1.200 liters of vapor and in the barometric condenser again into 1 liter of water. The incondensable elements, namely air, vapors that do not condense in the condenser and gases that are released, are extracted from the system by the vacuum pump 9 or ejector 9'.

The lyophilization process reduces micotoxins by up to 99% and pesticides by 75 to 99%.

The next step is that of end cooling, which requires special care, so that no oxidation and contamination will occur.

It is at the moment of discharging the hot, humid or dry product from the reactor 4 that oxidation may occur again, due to the contact of the hot product with air oxygen.

Thus, in order to avoid this oxidation, the product is vacuum cooled within the reactor 4, down to a temperature range in which oxidation virtually does not take place or is minimum, this range being comprised by the maximum temperature of 70° C. and the minimum temperature of 15° C.

This cooling takes place partly in vacuum, within the reactor 4, and partly in the cooler 7, according to FIGS. 1 and 2, and in the constructive variation of this equipment and process, the cooling may occur totally in vacuum within the reactor 4, according to FIG. 3.

During the cooling step, the internal pressure of the reactor 4 is negative and is of about 0.9 Kg/cm2. As to the temperature of the product when it comes out of the reactor 4 at the end of this step, it depends upon the negative pressure, or vacuum, applied. In this way, for a vacuum of up to absolute 45 mmHg, the product of the reactor 4 is discharged at a temperature ranging from 65 to 70° C. When the cooling is initiated with this temperature differential, one avoids 80% of oxidation in the cooling step. When vacuum is applied with ejector 9' and booster 7', the absolute pressure drops to absolute 6 mmHg, the product is discharged at a temperature ranging from 10° C. to 15° C. and does not need to be further cooled in the cooler 7. In this case, one avoids 99% of oxidation.

With these temperature ranges, there is no emanation of vapors, running of liquids, oxidation and formation of crusts in subsequent equipment, as for example, the conveyors, dryers and coolers. In this way, contamination of the product with microorganism is prevented.

In addition to eliminating the micotoxins and pesticides, the process of the present invention enhances the digestibility of the processed products by about 8-22% or more.

The present process and equipment are particularly useable in precooking soybeans. However, one can see that they can be employed in precooking various other kinds of grains, as for example, peanut, maize, among others.

During the process, the times of residence in the steps, the necessary pressure and the volume of processed products are automatically controlled by means of automation equipment, such as, for example, a PLC or CLP and by using computers, which brings about a much more homogeneous production.

A preferred embodiment having been described, it should be understood that the scope of the present invention embraces other possible variations, being limited only by the contents of the accompanying claims, which include the possible equivalents.

The invention claimed is:

1. A process for precooking grains or soybeans in a reactor, comprising the steps of:
   a) charging a monitored amount of grains or soybeans from a feeder into the reactor;
   b) applying a first negative pressure to reduce the internal pressure within the reactor so that the internal pressure ranges from a relative pressure of 4 kg/cm$^2$ to an absolute pressure of 6 mmHg;
   c) heating the grains or soybeans contained in the reactor up to a temperature range from 100° C. to 125° C. and maintaining the grains or soybeans at said temperature for a determined period of time;
   d) applying a second negative pressure to the reactor to obtain a pressure differential of from 1.4 to 2.5 kg/cm$^2$ while dragging off water, toxins, mycotoxins and pesticides from the grains or soybeans; and e) vacuum cooling the grains or soybeans in the reactor to obtain a cooled humid or dry grain or soybean product.

2. The process according to claim 1, wherein, in step (b), air is evacuated from the reactor.

3. The process according to claim 2, wherein, in step (c), vapor is both (i) directly injected onto the grains or soybeans and (ii) passed through a sleeve of the reactor thereby indirectly heating the grains or soybeans.

4. The process according to claim 3, wherein, in step (c), the grains or soybeans are maintained in a temperature range from about 100° C. to 125° C. for a period of from 1 to 25 minutes.

5. The process according to claim 4, wherein, at the end of said period, the internal pressure within the reactor ranges from 0.5 to 1.5 kg/cm$^2$.

6. The process according to claim 4, wherein, in step (d), the internal pressure within the reactor is a differential of from 1.4 to 2.5 kg/cm$^2$.

7. The process according to claim 6, wherein cell membranes of the grains or soybeans are broken and grain or soybean nutrients are exposed by action of the vapor.

8. The process according to claim 7, wherein step (d) includes a lyophilization process.

9. The process according to claim 8, wherein the second negative pressure is applied to the reactor until mycotoxins are reduced by up to 99% and pesticides are reduced by from 75 to 99%.

10. The process according to claim 6, wherein the temperature of the grains or soybeans is reduced to a range from 60° C. to 15° C. and the humidity of the grains or soybeans is dropped to a range from 12 to 12.5%.

11. The process according to claim 10, wherein, in step (e), the cooling process takes place by applying an internal negative pressure of 0.9 kg/cm$^2$.

12. The process according to claim 11, wherein the maximum temperature in the reactor during vacuum cooling is 70° C. and the minimum temperature in the reactor during vacuum cooling is 10° C.

13. The process according to claim 1, wherein, in step (e), the cooling process takes place in the reactor and subsequently in a cooler.

14. The process according to claim 1, wherein, in step (d), the relative pressure inside the reactor is of negative 0.9 kg/cm$^2$.

* * * * *